United States Patent
Westerinen et al.

(10) Patent No.: US 7,561,116 B2
(45) Date of Patent: Jul. 14, 2009

(54) MULTIPLE DISPLAY MONITOR

(75) Inventors: William J. Westerinen, Sammamish, WA (US); William Chambers Powell, III, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 361 days.

(21) Appl. No.: 10/355,331

(22) Filed: Jan. 31, 2003

(65) Prior Publication Data

US 2004/0150581 A1    Aug. 5, 2004

(51) Int. Cl.
G09G 5/00 (2006.01)
G06T 1/60 (2006.01)
G09G 5/39 (2006.01)
G06F 15/167 (2006.01)
G09G 5/36 (2006.01)

(52) U.S. Cl. ............... 345/1.1; 345/1.3; 345/3.1; 345/530; 345/531; 345/541; 345/545; 345/547

(58) Field of Classification Search ........... 345/1.1–1.3, 345/87–92, 10, 3.1–3.4, 530–532, 536, 539–547
See application file for complete search history.

(56) References Cited

U.S. PATENT DOCUMENTS

| | | | | |
|---|---|---|---|---|
| 5,067,021 A * | 11/1991 | Brody | | 348/383 |
| 5,625,386 A * | 4/1997 | Howard et al. | | 345/540 |
| 5,661,531 A | 8/1997 | Greene et al. | | |
| 5,668,569 A | 9/1997 | Greene et al. | | |
| 5,889,568 A | 3/1999 | Seraphim et al. | | |
| 5,977,933 A * | 11/1999 | Wicher et al. | | 345/3.1 |
| 6,088,005 A * | 7/2000 | Walls et al. | | 345/4 |
| 6,104,414 A * | 8/2000 | Odryna et al. | | 345/536 |
| 6,188,454 B1 | 2/2001 | Greene et al. | | |
| 6,262,696 B1 | 7/2001 | Seraphim et al. | | |
| 6,302,612 B1 * | 10/2001 | Fowler et al. | | 403/76 |
| 6,456,354 B2 | 9/2002 | Greene et al. | | |
| 6,483,482 B1 * | 11/2002 | Kim | | 345/3.1 |
| 6,587,082 B1 * | 7/2003 | Moore | | 345/1.3 |
| 6,774,868 B1 | 8/2004 | Bowen | | 345/1.3 |
| 6,819,304 B2 | 11/2004 | Branson | | 345/1.3 |
| 6,859,219 B1 * | 2/2005 | Sall | | 345/1.1 |
| 2001/0011965 A1 * | 8/2001 | Wilks | | 345/1.1 |
| 2002/0021258 A1 * | 2/2002 | Koenig | | 345/1.1 |
| 2002/0130821 A1 * | 9/2002 | Bronson | | 345/8 |

(Continued)

FOREIGN PATENT DOCUMENTS

JP    2001051673 A *   2/2001

*Primary Examiner*—Sumati Lefkowitz
*Assistant Examiner*—Alexander S Beck
(74) *Attorney, Agent, or Firm*—Woodcock Washburn LLP

(57) ABSTRACT

A monitor having multiple displays within the same housing. The displays may be, for example, separate LCD panels that are placed in close proximity to one another so as to give the appearance of a single, large display. At least two of the displays may be treated by a computer connected to the monitor as a single display. A display controller divides a single frame of information that is provided by a display adapter of the computer into display information for multiple displays. By using the multiple display controller, the multiple display monitor may have more displays or panels than the number of cables linking the monitor to a computer. The special display controller also does not require a graphics card for each display. A three panel or display monitor is provided in which a central, centered work area display is framed by two side panels or displays.

15 Claims, 13 Drawing Sheets

U.S. PATENT DOCUMENTS

2002/0167459 A1 11/2002 Baudisch et al. ............. 345/1.3
2004/0150581 A1 8/2004 Westerinen et al. .......... 345/1.3
2004/0222941 A1* 11/2004 Wong et al. .................. 345/1.1

* cited by examiner

MULTIPLE DISPLAY MONITOR

TECHNICAL FIELD OF THE INVENTION

The present invention is generally directed to computers, and more specifically directed to the use of multiple displays with a single computer.

BACKGROUND OF THE INVENTION

The use of multiple displays by computer enthusiasts continues to grow. Using more than one display allows a user to stretch his or her desktop to show more programs than if a single display is used. In addition, a single program may be stretched over multiple displays so that more of a document, such as a spreadsheet, may be seen without scrolling. A presentation may also have several pages open, with the pages spread across several different displays.

Because of the cost of producing large displays, purchasing two displays may provide the same amount of desktop space for less price than a large, single monitor. In addition to the cost of the monitor itself, however, conventional multiple monitor systems require an additional cable and display adapter, usually in the form of a video card, for each monitor. Alternatively, a special video card, often called a "dualhead" or multi-display card, must be purchased for the computer. Adding or changing the video cards requires opening the computer box and some knowledge of the internal structure of the computer. Moreover, the cables and video cards must be configured correctly by a user to create a single virtual display surface.

A drawback to the use of multiple monitors is that visually scanning from one monitor to another may be difficult. The wide frame that extends around the display for most monitors interrupts the eye when a user scans from one monitor to another, even when the monitors are placed as closely together as possible. In addition, the use of multiple monitors may cause discomfort for a user when viewing from one display to another.

SUMMARY OF THE INVENTION

The present invention provides a monitor having multiple displays within the same housing. The displays may be, for example, separate LCD panels that are placed in close proximity to one another so as to give the appearance of a single, large display.

In accordance with one aspect of the present invention, at least two of the displays are treated by a computer connected to the monitor as a single display. To this end, the monitor includes a display controller that divides a single frame of information that is provided by a display adapter of the computer into display information for multiple displays. By using the special multiple display controller, the multiple display monitor may have more displays or panels than the number of cables linking the monitor to a computer. The special display controller also does not require a graphics card for each display.

In accordance with another aspect of the present invention, a three panel or display monitor is provided in which a central, centered work area display is framed by two side panels or displays. The two side panels or displays together may be roughly the size of the central work area display.

There are a number of advantages provided by the monitor of the present invention. First, the side panels or displays may be located immediately adjacent to the central work area display. This arrangement prevents neck strain, because a user does not have to turn his or her head that much to view the side monitors or displays. In addition, the field of view between the adjacent panels is not interrupted such as in the case where two separate monitors are used. Moreover, because the two side panels are smaller than a single display of the same size, the production cost of producing a multiple display monitor is less.

Narrow seams between the side panels and the central work area display provide a smooth transition between the displays. In addition, the three part visual screen provides a natural division into a larger central work area (i.e., the central work area display) and peripheral areas (i.e., the side displays) that may be used for notifications, tree views, tool bars, and other items.

Other advantages will become apparent from the following detailed description when taken in conjunction with the drawings, in which:

DETAILED DESCRIPTION

Exemplary Operating Environment

Figure 1:
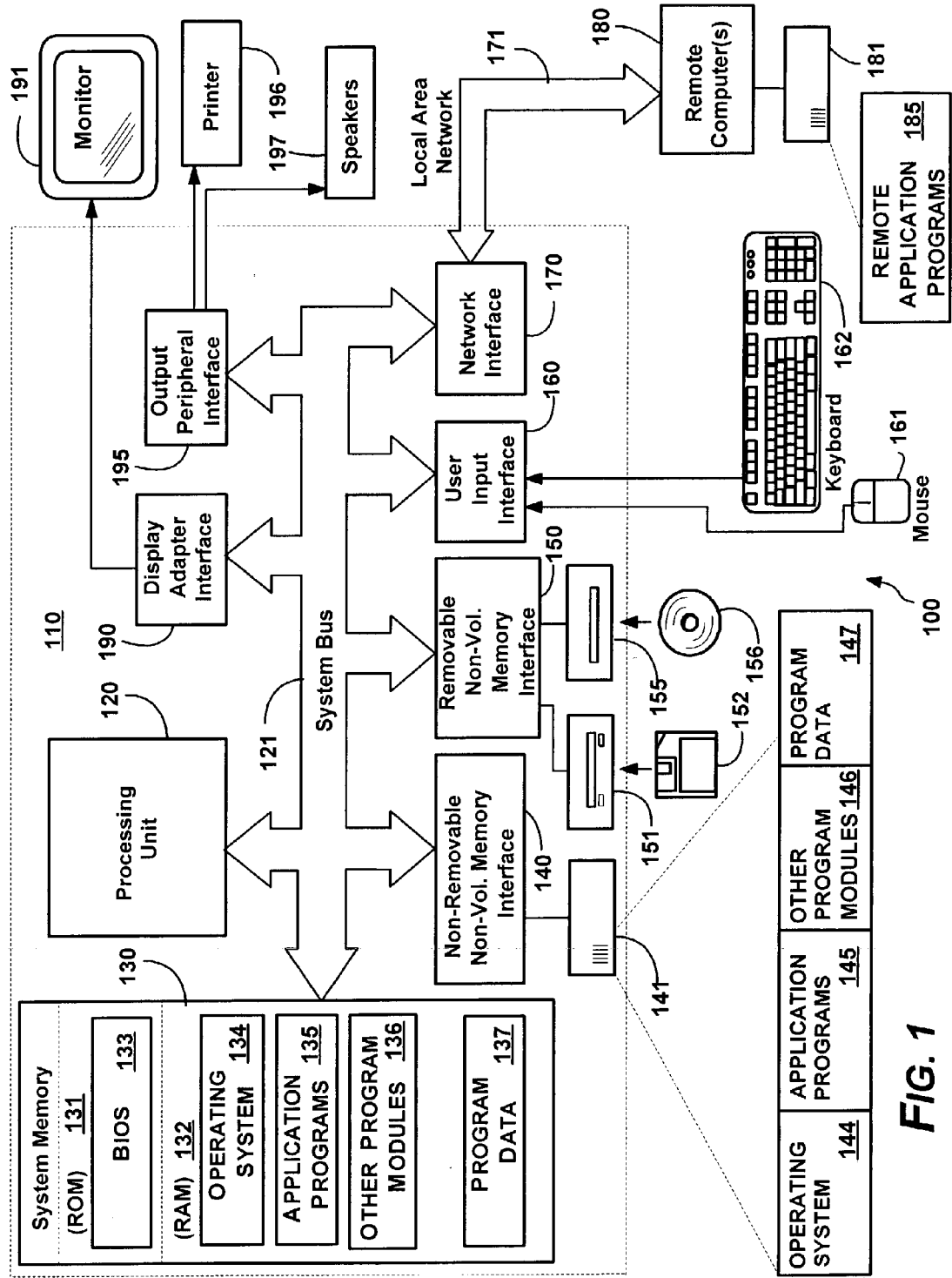
FIG. 1 is a block diagram representing a computer system into which the present invention may be incorporated.

FIG. 1 illustrates an example of a suitable computing system environment 110 on which the invention may be implemented. The computing system environment 110 is only one example of a suitable computing environment and is not intended to suggest any limitation as to the scope of use or functionality of the invention. Neither should the computing environment 110 be interpreted as having any dependency or requirement relating to any one or combination of components illustrated in the exemplary operating environment 110.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, digital television, simulator systems, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM,CD-RW, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media, or writeable/re-writeable optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a display adapter interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) (not shown), but may also include other networks. Such networking environments are commonplace in offices, enterprise-wide computer networks, intranets and the Internet.

When used in a LAN networking environment, the computer 110 is connected to the LAN 171 through a network interface or adapter 170. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Multiple Display Monitor

Figure 2:
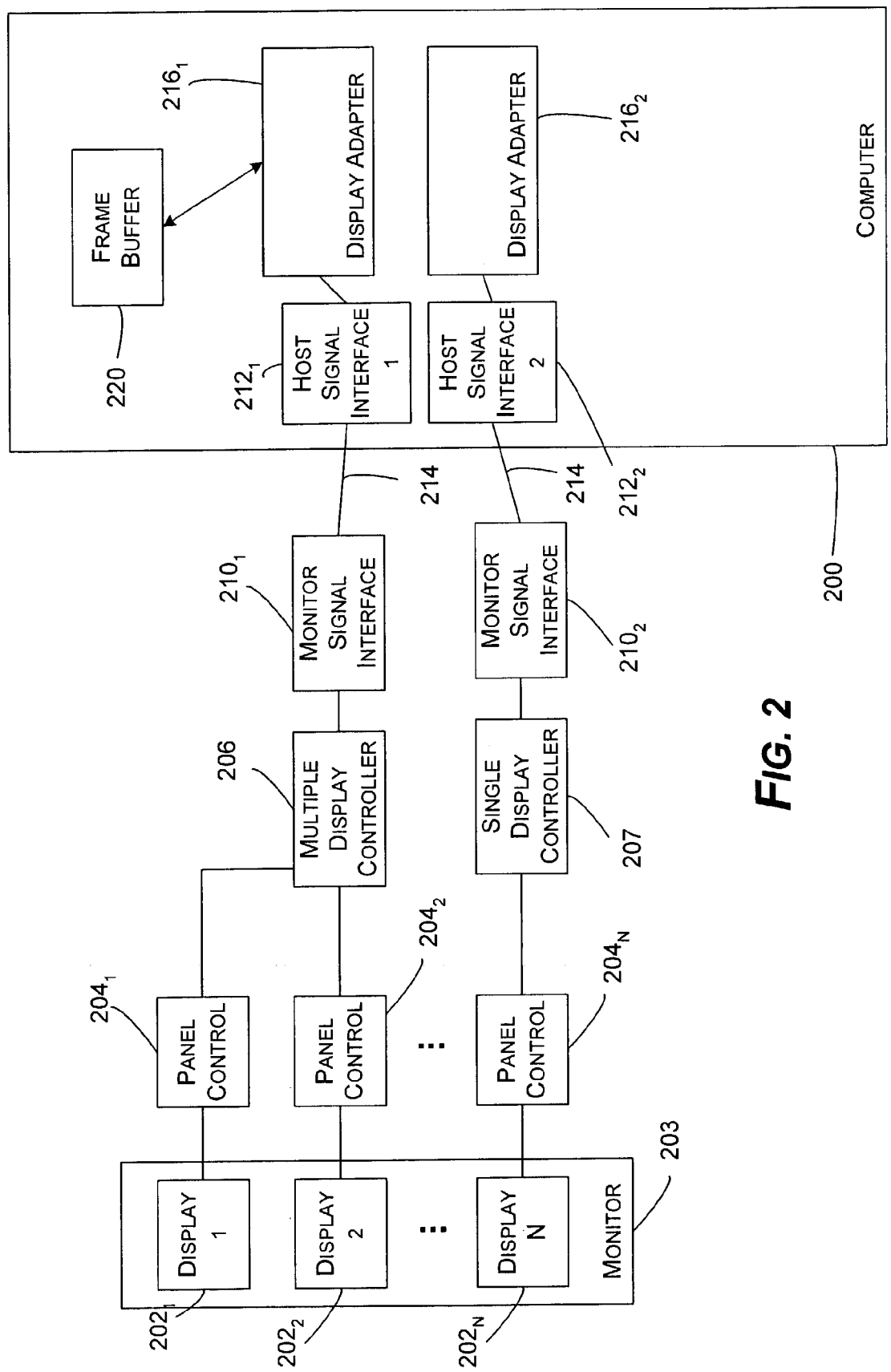
FIG. 2 is a block diagram of a computer connected to a multiple display monitor in accordance with one aspect of the present invention.

FIG. 2 shows a block diagram in which a computer 200 (e.g., the computer 110) is connected to multiple displays $202_1, 202_2 \ldots 202_N$ housed within a single monitor 203. Each of the displays 202 includes its own panel controller $204_1$, $204_2 \ldots 204_N$. In the embodiment shown, the first two panel controllers $204_1, 204_2$ are connected to a first display controller 206, and the remaining panel controller $204_N$ is connected to a second display controller 207.

The display controller 206 divides a single image frame provided by the computer 200 into multiple images for the multiple displays 202. Such a display controller 206 for operating multiple displays is described in detail in copending and commonly owned U.S. patent application Ser. No. 10/284, 045, filed Oct. 29, 2002 (the "045 application"), and incorporated herein by reference. As used herein, a display controller capable of operating multiple displays is referred to as a "multiple display controller." A conventional display controller 207 configured to function with one display, such as the display controller 207, are referred to herein as "single display controllers."

Although the '045 application may be read to understand the operation and configuration of a multiple display controller, a brief description is provided herein for the benefit of the reader. In general, a multiple display controller splits a single, large image frame provided by a computer into targeted display information for one or more displays. For example, a left half of the image data may be sent to a left display. In addition, the multiple display controller may provide information to the computer so that the computer may know how to target a particle display. For example, the computer may build its large image frame knowing that the left half will eventually be directed to a left display.

Thus, when connected to a computer, a multiple display controller may provide information about the displays to which it is connected. The information provided to the computer may include information about a single virtual display surface defined by all displays, such as the size, resolution, and refresh rate for the combined virtual display surface. In addition, the EDID information may include information about each of the individual monitors or displays, including the location of the individual displays in the single virtual display, and available resolutions and refresh rates for each of the monitors.

The information used by the computer depends upon whether the computer is capable of taking advantage of the locations and features of the multiple displays. If not, then the information about the single virtual display may be utilized by a computer. The computer treats the multiple monitors like a single monitor having the characteristics of the single display surface. Applications or window panes displayed by the computer may overlap two or more displays, and thus does not take advantage of the layout of the multiple displays.

If a computer is capable of recognizing the locations and features of the multiple displays, then the operating system of the computer and/or applications running on the computer may target particular display information to a particular display or displays. To this end, the computer may optimize display quality and presentation for a user. An application programming interface (API) may be provided that exposes itself to applications so that the applications may be aware of the multiple displays and alter their images so that one or more particular panes are shown on a particular display or advantageously spread across multiple displays.

Although the computer recognizes that there are multiple displays, because of cable, display adapter, or other limitations, it still is limited to sending a single frame of data to the multiple display controller. Thus, information for the multiple displays must be properly mapped within the single frame of data. A display component, such as a video driver, may be used by the computer to expose virtual display surfaces for each of the displays that represent the corresponding portion of the single frame. The applications or the operating system may then target image information to the virtual display surfaces.

The virtual display surfaces are combined to form the single frame in a frame buffer (e.g., the frame buffer 220) in the computer. The frame is forwarded to the multiple display controller 206, which divides the image, for example using line or frame buffers, and then provides appropriate display information to each of the separate displays. For some implementations of the invention, the image data for a particular display may be rotated so that it matches the scanning direction of the target display.

In any event, one or more multiple display controllers 206 may be used with one or more single display controllers 207 to provide appropriate image data to the displays 202. Also, In accordance with one aspect of the present invention, as is further described below, the present invention may be implemented with only a single multiple display controller 206. In such an embodiment, the single multiple display controller 206 is configured to provide image data to all of the displays 202 in the monitor 203. Alternatively, the invention may utilize a multiple display controller, such as the multiple display controller 206, to control one or more panels or displays 202 in the monitor 203, and also implement one or more single display controllers (e.g., the single display controller 207) to control one or more displays 202, with one single display controller 207 being used for each display 202. Other combinations may be used in accordance with the spirit of the present invention.

Although shown as separate components in FIG. 2, the display controller 206 (or the display controller 207) and its associated panel controller or controllers 204 may be combined in a single circuit board, or their functions may be distributed over a number of different components, or two or more of the controllers may be combined to form a single component, or the functions of two or more of the components may be spread over multiple elements on the same circuit board, multiple circuit boards, or may otherwise be provided. Similarly, unless otherwise stated herein, the components and elements used to describe the present invention are described as separate components for ease of description, and the functions of the components may be provided by several different devices or modules, and/or one or more of the components may be combined with another to form a single device or module.

In any event, a monitor signal interface 210, is attached to the display controller 206, and a separate monitor signal interface $210_2$ is connected to the display controller 207. The monitor signal interfaces 210 may each be, for example, a scan converter or a digital receiver (e.g., configured to receive TMDS or LVDS).

A cable 214 extends between each of the monitor signal interfaces 210 and a respective host signal interface $212_1$ or $212_2$ connected to or otherwise associated with a respective display adapter $216_1$ or $216_2$ located in the computer 200. The host signal interfaces 212 may each be, for example, a digital-to-analog converter (DAC), or a digital transmitter sending a digital signal, such as TMDS (DVI) or LVDS. The display adapter 216 may be a video graphics card, may be an integrated adapter, or may be another suitable component that enables a computer to provide display information to the displays 202. The display adapter 216 is connected to the operating system 134 (FIG. 1) for the computer 200 and may be utilized with one or more applications 135 (also FIG. 1).

As can be understood, each display controller 206 or 207 requires its own monitor signal interface 210, cable 214, host signal interface 212, and display adapter 216. As such, there are advantages to use of the multiple display controller 206, in that a multiple display controller 206 may control multiple panels with a single monitor signal interface 210, a single host signal interface 212, a single cable 214, and a single display adapter 216. Set-up and equipment costs may thus be saved by utilizing the multiple display controller 207.

Figure 3:
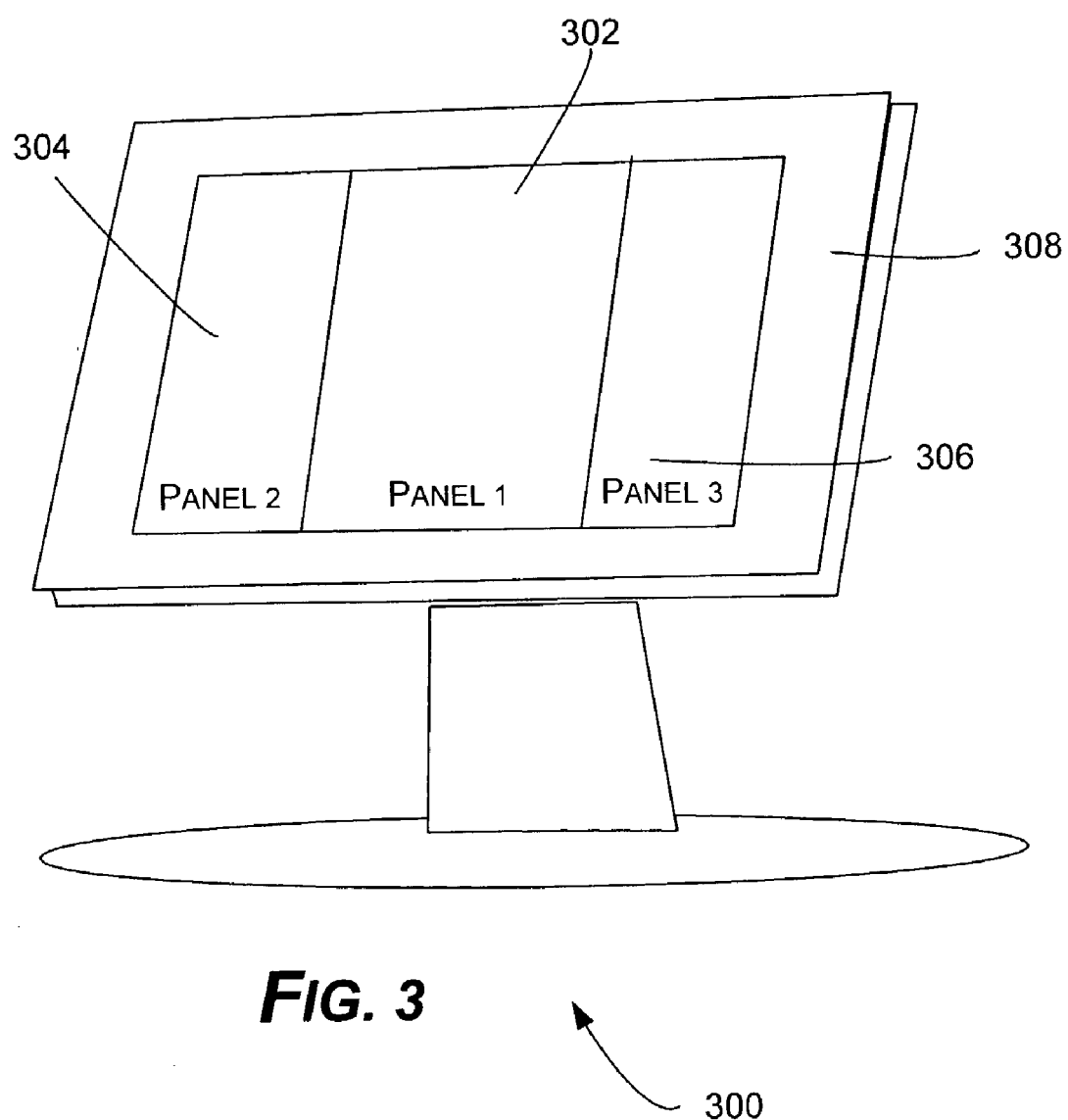
FIG. 3 is a side perspective view of a monitor having multiple display panels in accordance with one aspect of the present invention.

The displays 202 are preferably liquid crystal display panels (LCD), but alternatively may be plasma, cathode ray tubes (CRT), or another devices that are capable of displaying graphics and/or text. In accordance with one aspect of the present invention, the displays 202 are provided as separate panels that are aligned adjacent to one another within the monitor 203 so as to provide a single, contiguous display surface. An example of such a monitor 300 is shown in FIG. 3. The monitor 300 includes three panels 302, 304, 306 that together provide a single, large display surface within a single monitor housing 308. In such an embodiment, each display 202, as used herein, would be one of the physical panels 302, 304, 306. This implementation of a multiple panel monitor is significantly less expensive than providing a single panel monitor of the same size, especially if the panels are of the LCD variety. The reason the multiple panel monitor is less expensive to manufacture is that multiple smaller LCD panels may be produced with far less rejects than a single large panel LCD. The better production yields far offset the assembly costs of the multiple small monitors.

Figure 10:
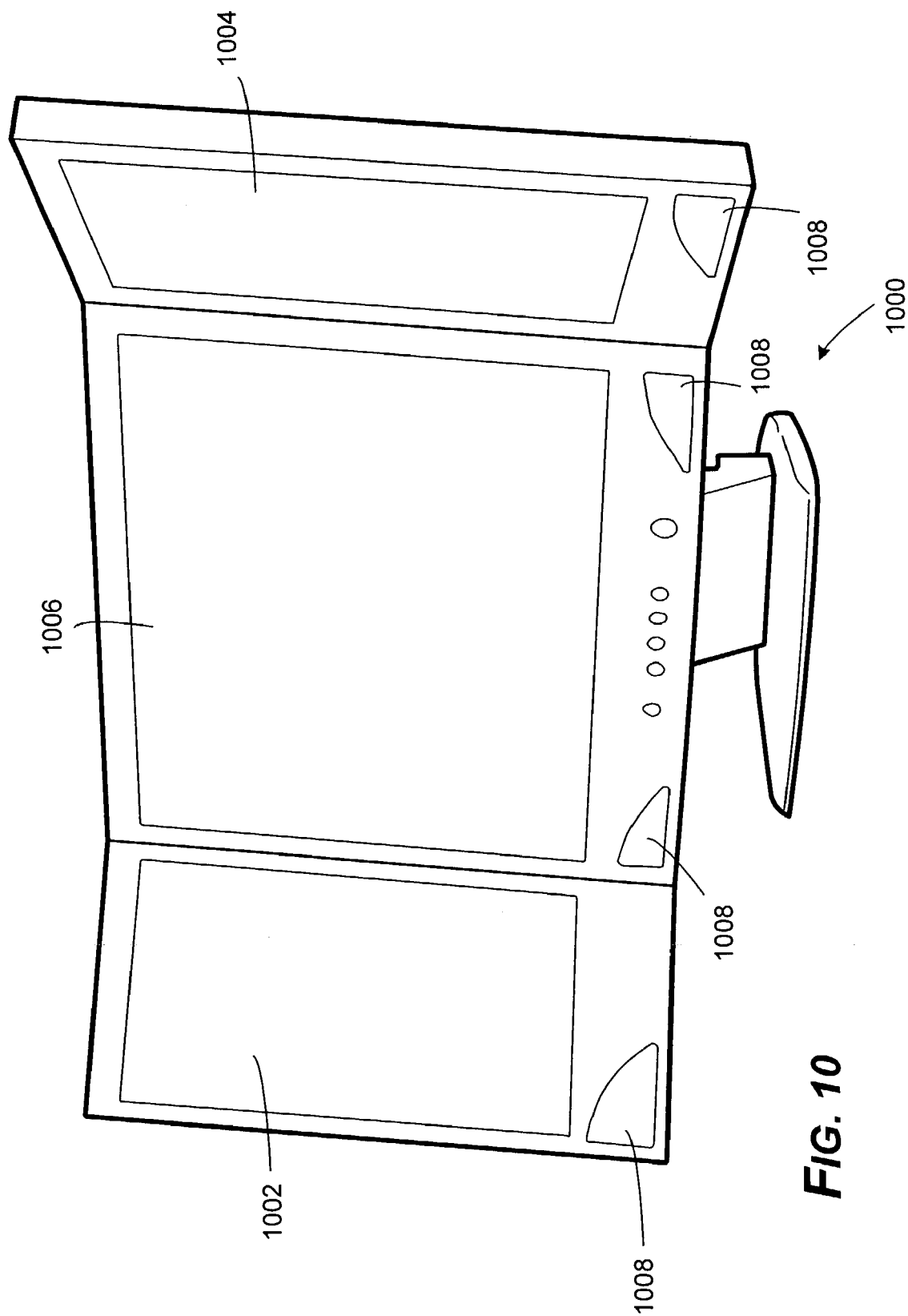
FIG. 10 shows an alternate embodiment of a three-panel monitor in accordance with one aspect of the present invention.

FIG. 10 shows another example of a three-panel monitor 1000 in accordance with the present invention. Unlike the monitor 300 shown in FIG. 3, the monitor 1000 in FIG. 10 does not include coplanar panels. Instead, the outer ends of the side panels 1002, 1004 of the monitor 1000 are bent inward relative to a view side of a central panel 1006. In the shown embodiment, the side panels 1002, 1004 are slightly separated from the central panel 1006. However, if desired, the side edges of the panels 1002, 1004 may actually be in closer proximity to one another, and may actual touch, so that the three panels have the appearance of a continuous, bent screen.

The embodiment shown in FIG. 10 provides many benefits over the embodiment shown in FIG. 3. For example, the bent side panels 1002, 1004 are more clearly seen by the peripheral vision of a user than if the entire monitor was flat. In addition, if other features or components are provided on the monitor 1000, such as speakers 1008, these components may be more appropriately aligned for the vision and/or hearing of the user. Moreover, and importantly, the tilted side panels 1002, 1004 as configured in FIG. 10 reduce the number of head turns necessary when reading or scanning the monitor 1000 from left to right. As such, the configuration of the monitor 1000 significant increases productivity, because large displays can cause as many as 4 head turns going from left to right, and beyond 4 head turns there is a decrease in productivity and increase in neck strain due to the head turns. By tilting the side panels 1002, 1004, they are more readily viewed without head tilt, thus minimizing head turns, which increases productivity and reduces neck strain.

Figure 11:
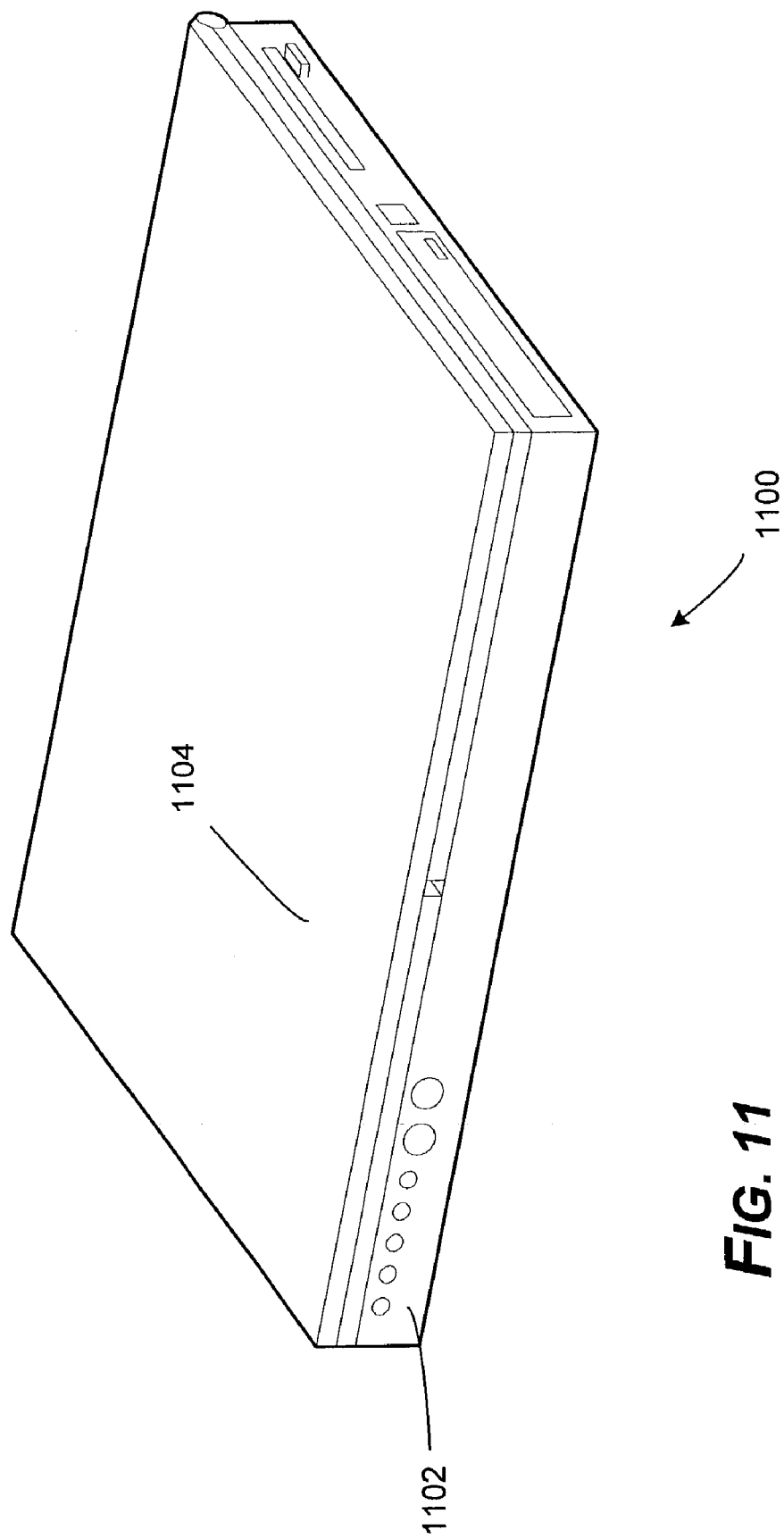
FIG. 11 shows yet another embodiment of a three-panel monitor in accordance with one aspect of the present invention, the monitor being attached to a laptop computer, and the laptop computer shown in a closed position.
Figure 12:
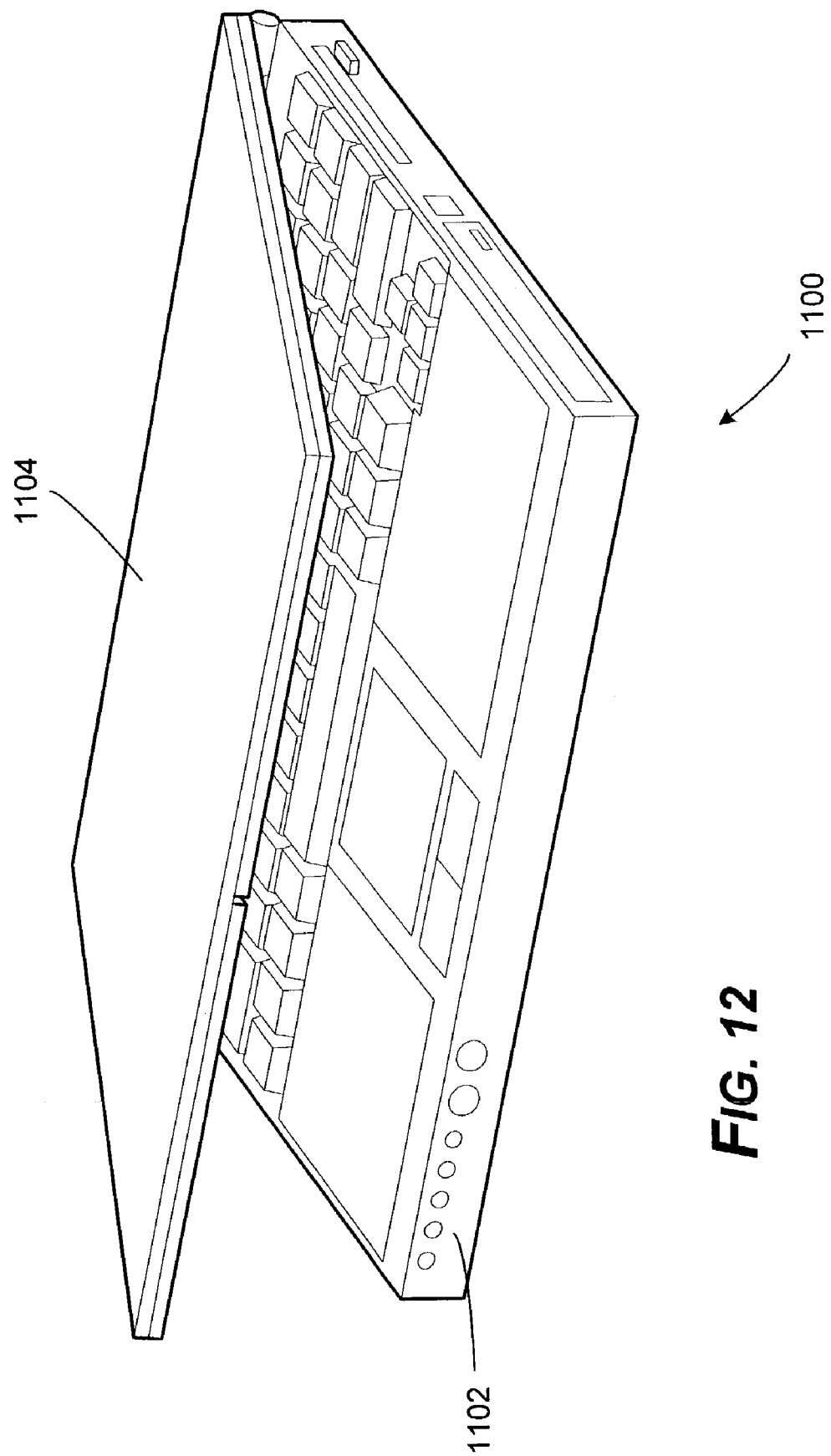
FIG. 12 shows the laptop and monitor of FIG. 11, with the monitor partly unfolded.
Figure 13:
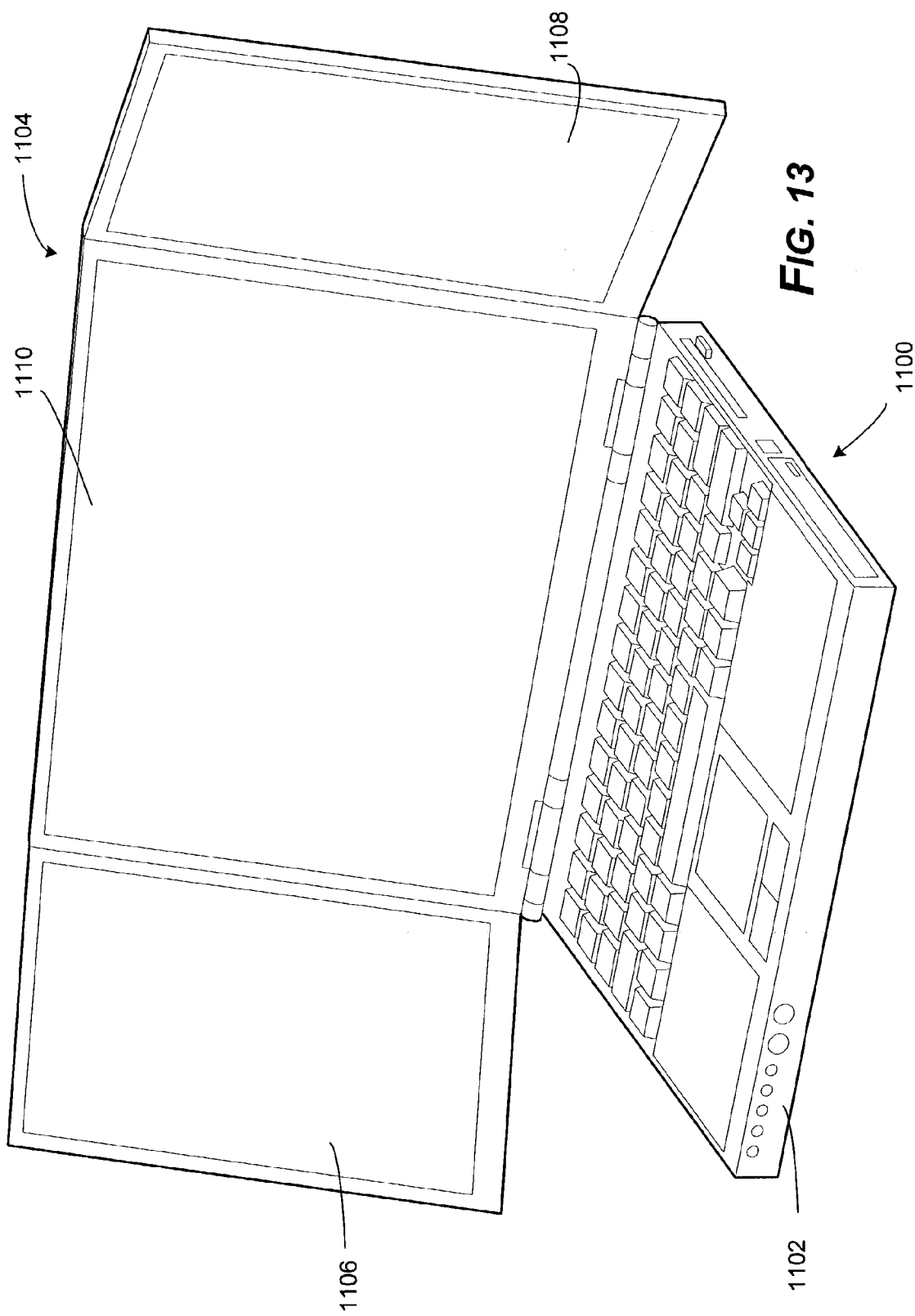
FIG. 13 shows the laptop and monitor of FIG. 11, with the monitor fully unfolded for use.

FIGS. 11-13 show another embodiment of a monitor in which the invention may be implemented. In the embodiment shown in FIGS. 11-13, a laptop 1100 includes a base 1102 and a monitor assembly 1104. The base 1102 is a typical laptop base, and includes, for example, a keyboard and the internal computing components of the laptop 1100.

The monitor assembly 1104 includes a novel, three-panel display having two side panels 1106, 1108 hinged to a central panel 1110. As shown successively in FIGS. 11-13, the screen assembly 1104 can be folded away from the base 1102 (FIG. 12), and then outward to a position where it is in normal use. The two side panels 1106, 1108 of the monitor may then be folded out relative to the central panel 1110 (FIG. 13).

The folding out of the side panels 1106, 1108 provides increased viewing surface for a user. These side panels 1106, 1108 may be provided at an angle relative to the central panel 1110, such as is shown in FIG. 13. As such, the side panels 1106, 1108 and the central panel 1110 offer many of the benefits of the arrangement of the monitor 1000 shown in FIG. 10. In addition, because the side panels 1106, 1108 are hinged to the central panel 1110, the side panels 1106, 1108 may be conveniently stored between the central panel 1110 and the base 1102. Alternatively, if desired, the side panels 1106, 1108 could be folded outward to extend along the back side of the central panel 1110. However, in such an embodiment, the screen for the side panels 1106, 1108 would be exposed for potential damage.

FIGS. 4-9 show several examples of possible implementations of the present invention. These implementations are not meant to be exhaustive of all possible applications of the present invention, but provide several different examples of variations of the display controllers and frame buffers that may be used with the present invention.

Please note that although common reference numerals are used throughout FIGS. 4-9, the host signal interfaces 212, the multiple display controllers 206, and the panels or displays 202 may have to be configured differently to operate in accordance with the particular embodiment being described. However, for ease of description, each of these elements is given like element numerals throughout the several embodiments.

For each of the embodiments shown in FIGS. 4-9, three panels are used, and are arranged such as is shown in FIG. 3. As further described below, this implementation provides many display advantages.

Figure 4:
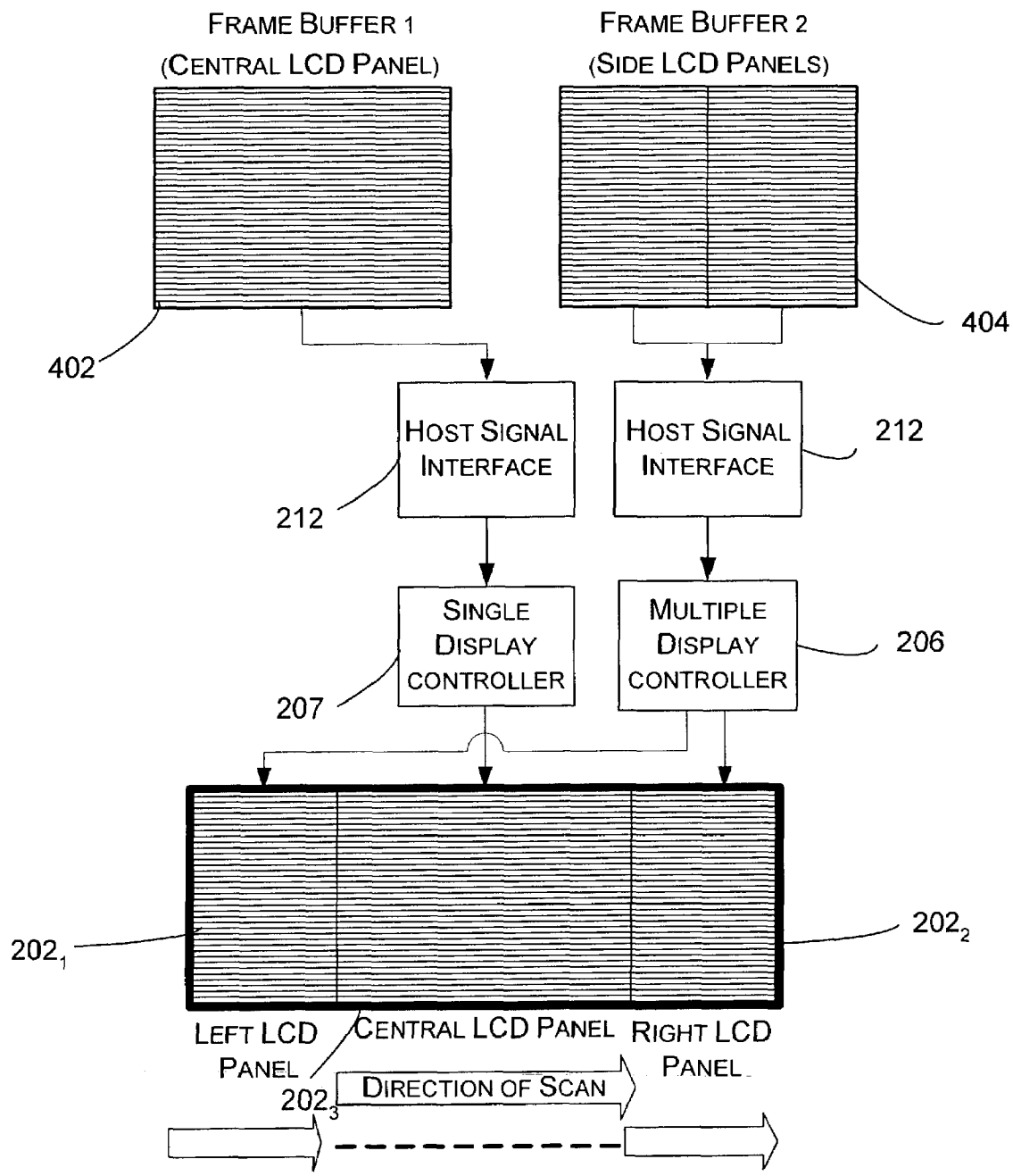
FIG. 4 is block diagram illustrating components for providing targeted image information to multiple displays in accordance with a first embodiment of the present invention.

FIG. 4 shows an example of a monitor utilizing both a single display controller 207 and a multiple display controller 206. In this embodiment, all of the displays 202 are LCD panels, and are arranged so that they scan horizontally. Two host signal interfaces 212 are utilized. First and second frame buffers 402, 404 are used for arranging data images for delivery from the computer 200 to the display controllers 206, 207. The first frame buffer 402 receives targeted image data that is delivered to the central LCD panel $202_3$ via the single display controller 207. The second frame buffer 404 receives targeted image data for the left and right LCD panels $202_1$ and $202_2$. The computer 200 provides image data to the appropriate location within the frame buffer 404 in accordance with information provided by the multiple display controller, as described above. The multiple display controller 206 receives the image data and appropriately divides it between the left and right LCD panels $202_1$ and $202_2$. Line or frame buffers may be used to define the left and right LCD panels $202_1$ and $202_2$.

One difficulty that may be encountered when using the embodiment of FIG. 4 is that the computer 202 must properly define line buffers so that a frame of data in the frame buffer 404 is properly divided between the panels 202, and $202_2$. Typically, for a display that scans horizontally, linear data begins at a top of the panel, extends horizontally to the panel edge, and then starts on the next line, much in the same order as reading a page of text. The implementation in FIG. 4 requires that the image data for the left and right LCD panels $202_1$, $202_2$ be stored so that a segment of data is sent to the left LCD panel, followed by a segment to the right LCD panel, followed by a segment to the left LCD panel, and so forth. This implementation thus requires that the data signal "jump" from the left panel $202_1$ to the right panel $202_2$. However, as long as the line or other buffers are properly defined for the image data, targeting the proper data to the appropriate display is not a problem.

With appropriate information sent to each of the panels $202_1$, $202_2$, and $202_3$, the computer may target particular image data to one or more of the panels 202. In this manner, the display location and properties of each of the displays 202 may be used to the best advantage of the computer 200. As an example, the computer (e.g., the operating system 134 or an application 135) may target the central LCD panel $202_3$ as a work area, and may target the left LCD panel $202_1$ for a tree control for an application. The right LCD panel $202_2$ may, in turn, be targeted for a tool bar. To this end, the wider-than-tall aspect ratio of the central LCD panel $202_3$ is more natural for a main working area, and the taller-than-wide aspect ratio for the left and right LCD panels $202_1$, $202_2$ is more natural for status, tool bar, and tree areas.

Figure 5:
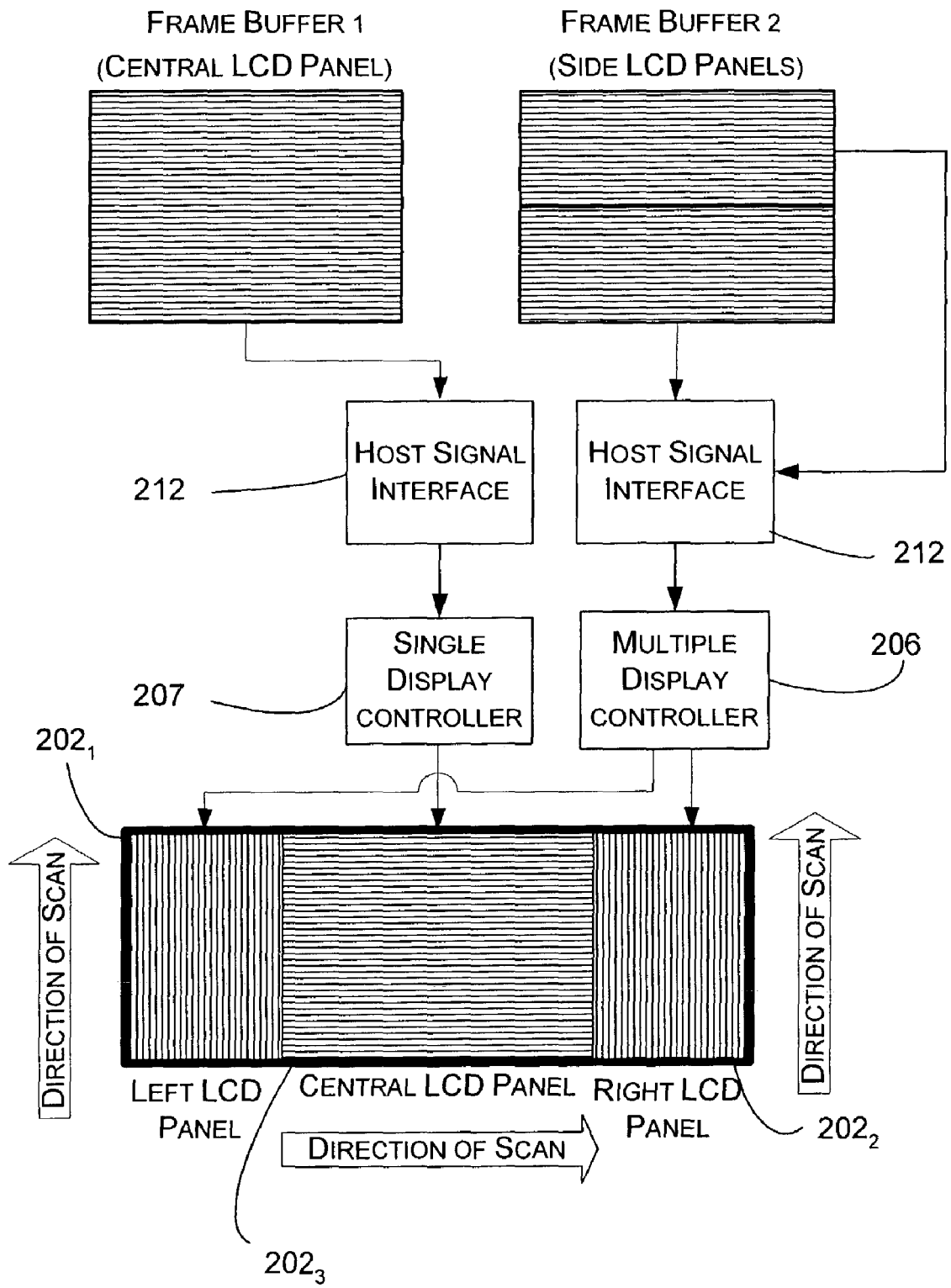
FIG. 5 is a block diagram illustrating components for providing targeted image information to multiple displays in accordance with a second embodiment of the present invention.

FIG. 5 shows an embodiment similar to FIG. 4, but with left and right LCD panels $202_1$, $202_2$ that scan vertically. The vertical scan direction of these side panels $202_1$, $202_2$ addresses any potential difficulties caused by line buffers and the "jump" of the data signal in the implementation shown in FIG. 4.

Figure 6:
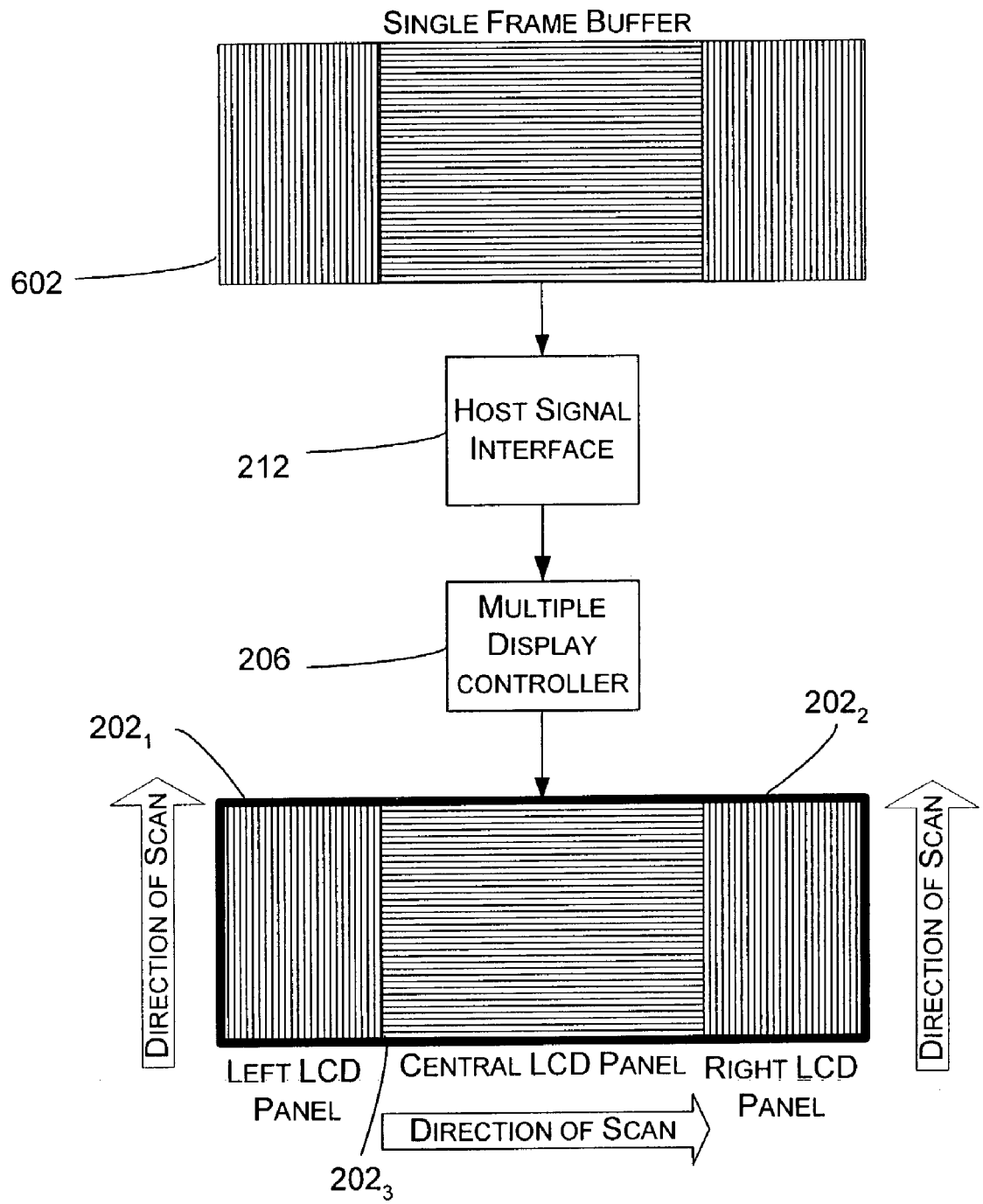
FIG. 6 is a block diagram illustrating components for providing targeted image information to multiple displays in accordance with a third embodiment of the present invention.
Figure 7:
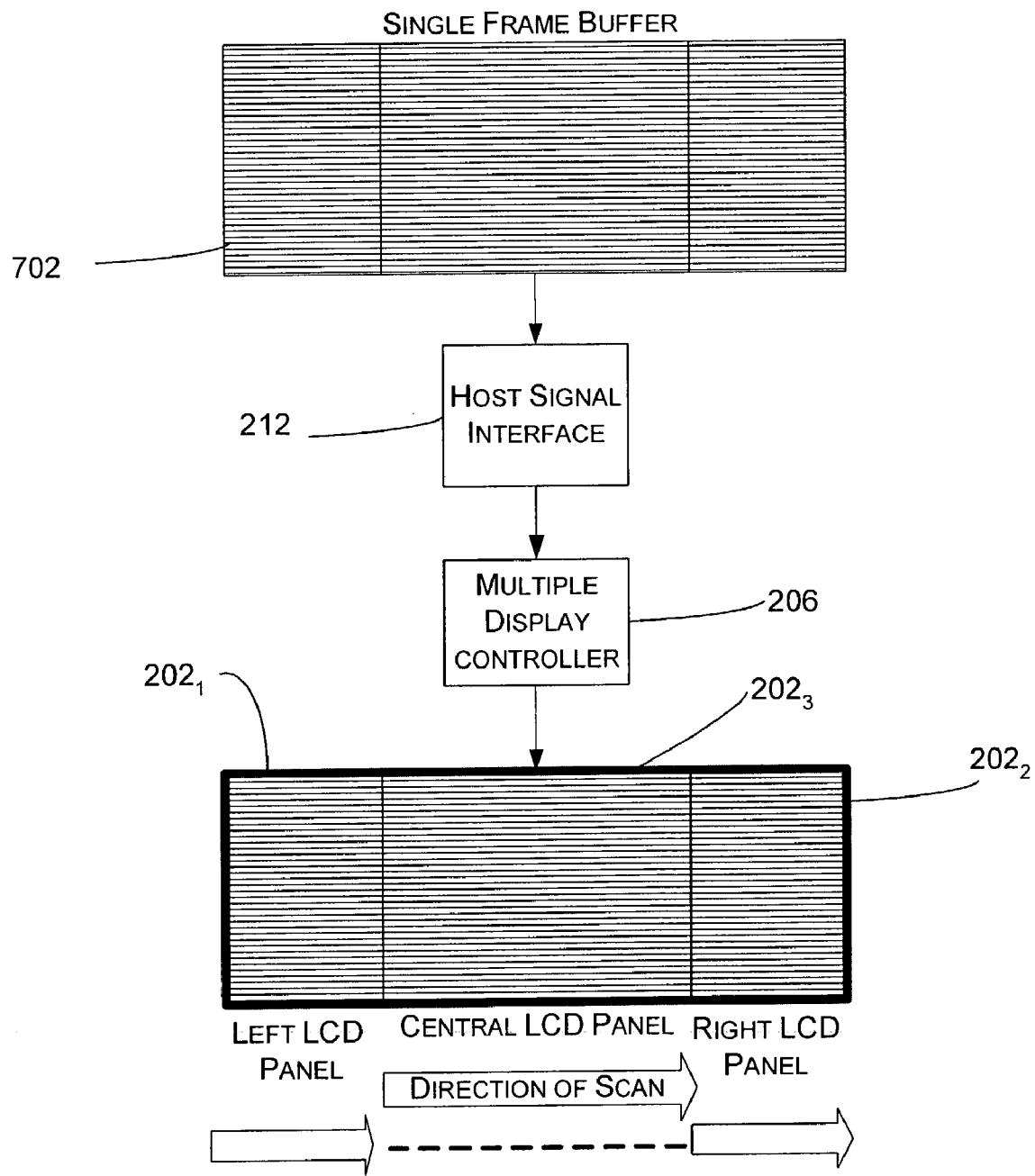
FIG. 7 is a block diagram illustrating components for providing targeted image information to multiple displays in accordance with a fourth embodiment of the present invention.

FIGS. 6 and 7 show an embodiments having a single frame buffer 602 (FIG. 6) and 702 (FIG. 7). In these embodiments, the multiple display controller 206 receives the image data for the entire frame buffer and directs it to the appropriate displays 202. The implementations in FIGS. 6 and 7 are particularly advantageous in that they require a single host signal interface 212, and a single multiple display controller 206. In addition, they require only a single video cable 214, and the computer 200 needs only one display adapter. Thus, these implementations save cost and configuration time for a user, in that a user may plug the monitor 203 into the computer 200, and the monitor 203 should be ready for operation, with the possible requirement of the installation of a driver.

The embodiment in FIG. 6 includes two side panels $202_1$, $202_2$ that scan vertically, and the embodiment in FIG. 7 includes two side panels $202_1$, $202_2$ that scan horizontally. For the embodiment in FIG. 7, image data may be provided linearly, across the three panels 202, and then starting again at the next line for the panels. For the embodiment of FIG. 6, frame buffers may be defined for the image data provided by the single frame buffer 602 so that the image data may be appropriately rotated when presented to the left and right LCD panels $202_1$, $202_2$.

In the embodiment shown in FIG. 8, again, a single frame buffer 802 is utilized. In this embodiment, the frame buffer 802 is aligned vertically so that the image information for the left LCD panel $202_1$ is arranged at a top portion, the central LCD panel $202_3$ is located centrally, and the image data for the right LCD panel $202_2$ is located at a bottom portion of the image data.

In this embodiment, each display includes its own multiple display controller $206_1$, $206_2$, or $206_3$. The same image data signal is sent, via a host signal interface bus 804, to each one of the display controllers. The host signal interface bus 804 is similar to the signal interface 212, but is configured to forward the signal it receives to multiple displays. Each display controller 206 includes logic to detect which part of the signal is directed to its panel or display 202, and routes just that part of the signal to its panel, and ignores the rest of the signal. FIG. 9 is similar to FIG. 8, but includes a single frame buffer 902 aligned horizontally.

Figure 8:
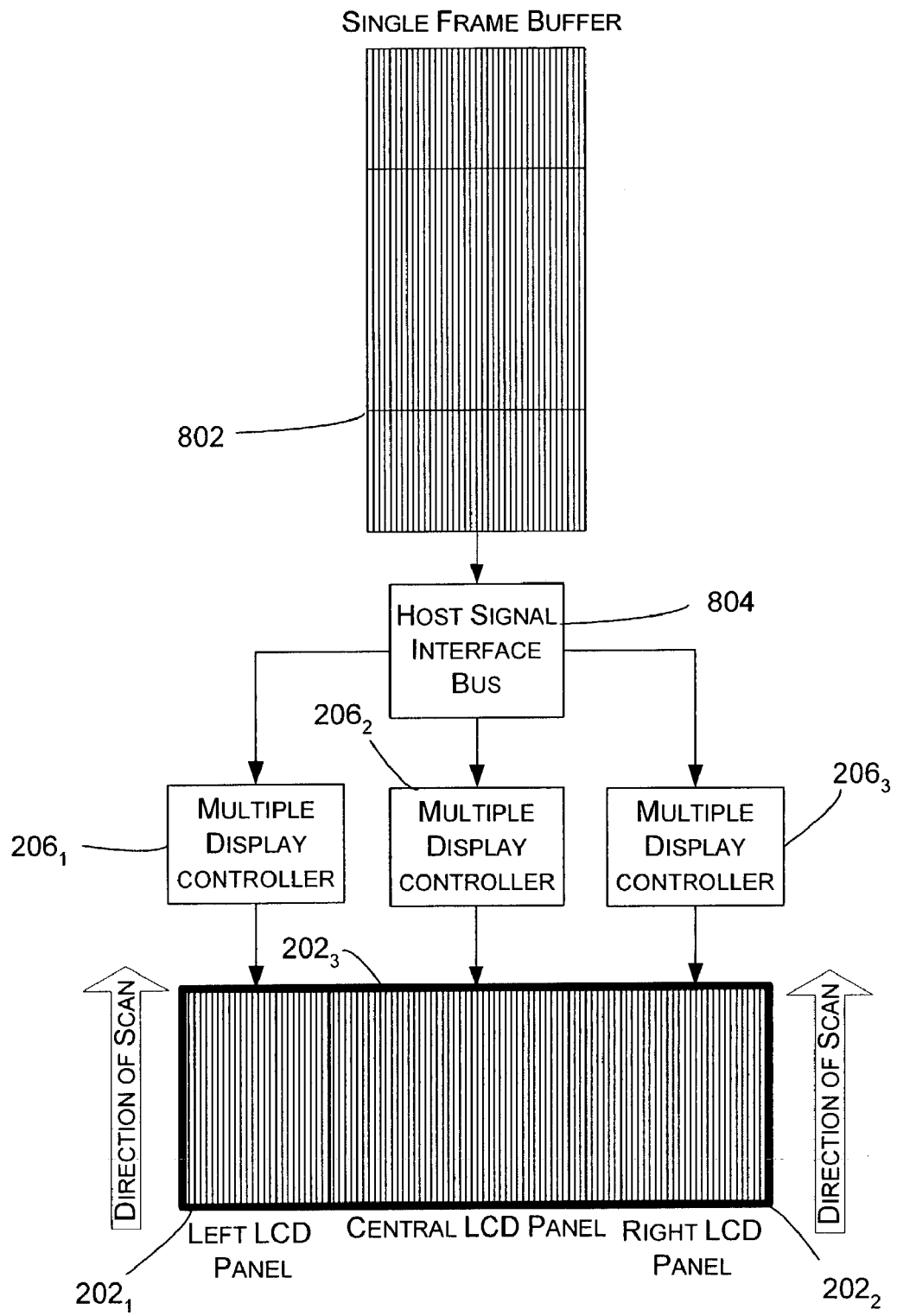
FIG. 8 is a block diagram illustrating components for providing targeted image information to multiple displays in accordance with a fifth embodiment of the present invention.
Figure 9:
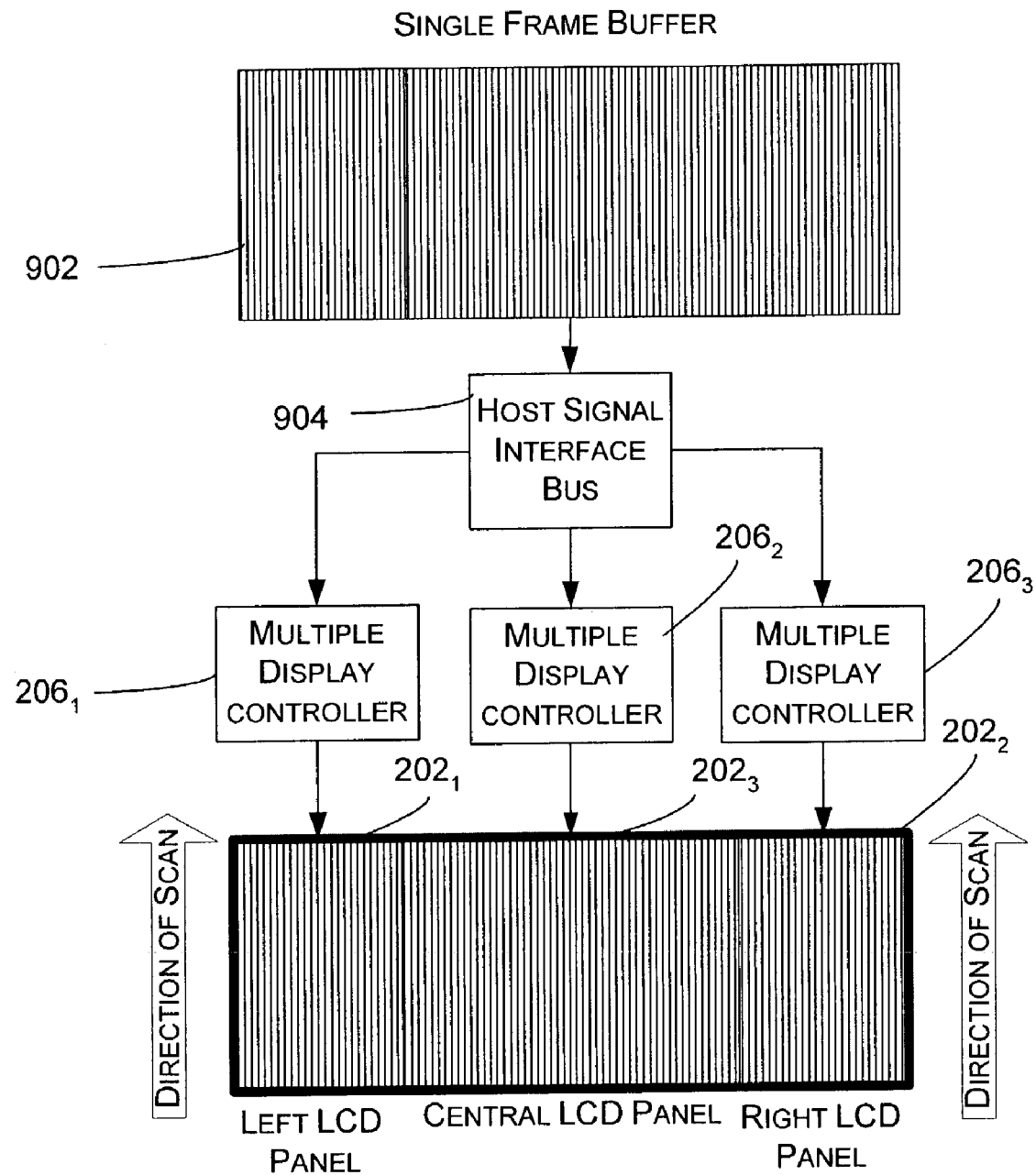
FIG. 9 is a block diagram illustrating components for providing targeted image information to multiple displays in accordance with a sixth embodiment of the present invention.

An advantage to the embodiments shown in FIGS. 8 and 9 is that the host signal interface bus may be used with multiple panels or displays, each of which has a multiple display controller, or another type of suitable controller for filtering only relevant data to its display. The host signal interface bus provides a single frame of image data to each of the display controllers, so that each do not have to be connected to the computer, thus saving the costs of cables, adapters, and plugs.

As can be understood from the foregoing, several different implementations of the present invention are possible. Many of the different implementations provide different advantages over other implementations. However, it can be understood that the multiple display controller 206, the scan direction, the frame buffers, and the arrangement of the displays 202 may be arranged in accordance with particular goals or to provide a particular effect.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the invention is to cover all modifications, alternative constructions, and equivalents falling within the spirit and scope of the invention, as defined in the appended claims.

What is claimed is:

1. A display system, comprising:
   a housing for a multi-monitor display;
   a central display mounted in the housing ;
   a left display mounted in the housing on one side of the central display;
   a right display mounted in the housing on the other side of the central display;
   a multiple display controller connected to the right display and the left display, and a first frame buffer to store a single frame of image data received from a computer, wherein no-contiguous display surfaces of the left and right displays are combined to form a single virtual display surface represented by a single frame in the first frame buffer, and wherein the non-contiguous display surfaces of the left and right displays are mapped to different regions within the single frame, and wherein the multiple display controller is configured to split a single frame of image data stored in the first frame buffer into first image data and second image data representing two separate and non-contiguous images comprising a first image and a second image, and wherein the first image is displayed on the left display and the second image is displayed on the right display, the multiple display controller providing information about the multi-monitor display to the computer, and wherein the first image data and the second image data in said first frame buffer are rotated before being displayed to match a scanning direction of the left display and the right display;

a second display controller connected to the central display configured to provide a second frame buffer of image data displaying a third image from the computer to the central display;

an operating system, residing in the computer, the operating system providing an application programming interface (API) to software applications, the API informing the software applications of the multi-monitor display, wherein the software applications alter images to utilize the first frame buffer and the second frame buffer to display three separate and non-contiguous images.

2. The display system of claim 1, wherein the right and left displays each scan horizontally.

3. The display system of claim 1, wherein the right, left, and central displays each scan horizontally.

4. The display system of claim 1, wherein the right and left displays each scan vertically.

5. The display system of claim 4, wherein the central display scans horizontally.

6. The display system of claim 4, wherein the central display scans vertically.

7. The display system of claim 1, wherein the left and right displays are situated at angles to the central display.

8. The display system of claim 1, wherein the left and right displays are hinged relative to the central display.

9. The display system of claim 8, wherein the multi-monitor display is configured to be attached to a laptop computer, and wherein the left and right displays fold against the central display during storage.

10. The display system of claim 9, wherein the multi-monitor display is configured such that the left and right displays are stored between the central display and a base for a laptop during storage.

11. A display system comprising:
a multi-monitor display comprising a first display and a second display;
a frame buffer in a host computer;
a first display adapter in communication with the frame buffer;
a first host signal interface in communication with the first display adapter;
a first monitor signal interface in communication with the first host signal interface;
a multiple display controller in communication with the first monitor signal interface and associated with a first and second panel controller driving the first and second displays, respectively, the multiple display controller providing information about the multi-monitor display to the host computer;
wherein the frame buffer stores a single frame of image data received from the computer, wherein display surfaces of the left and right displays are combined to form a single virtual display surface represented by a single frame in the frame buffer, and wherein the display surfaces of the left and right displays are mapped to different regions within the single frame; and
wherein, the multiple display controller is configured to split a single frame of image data stored in the frame buffer into separate and non-contiguous images, wherein each image is displayed on a respective one of the first and second displays, wherein the separate and non-contiguous images from the frame buffer are rotated before being displayed to match a scanning direction of the respective first and second displays; and
an operating system, residing in the host computer, the operating system providing an application programming interface (API) to software applications, the API informing the software applications of the multi-monitor display, wherein the software applications alter image to utilize the frame buffer to provide the separate and non-contiguous images for display.

12. The display system of claim 11, wherein the first monitor signal interface comprises at least one of a scan converter and a digital receiver.

13. The display system of claim 12, wherein the digital receiver is configured to receive one of TMDS and LVDS signal formats.

14. The display system of claim 11, wherein the first and second monitor displays are one of liquid crystal display panels, plasma panels, and cathode ray tubes.

15. The display system of claim 11, further comprising:
a second display adapter in communication with the frame buffer;
a second host signal interface in communication with the second display adapter;
a second monitor signal interface in communication with the second host signal interface;
a single display controller in communication with the second monitor signal interface and associated with a third panel controller driving a third monitor display.

* * * * *